(12) United States Patent
Jensen (10) Patent No.: US 9,494,223 B2
(45) Date of Patent: Nov. 15, 2016

(54) HARMONIC DRIVE APPARATUS

(71) Applicant: The Boeing Company, Chicago, IL (US)

(72) Inventor: Max Neal Jensen, Redmond, WA (US)

(73) Assignee: The Boeing Company, Chicago, IL (US)

(*) Notice: Subject to any disclaimer, the term of this patent is extended or adjusted under 35 U.S.C. 154(b) by 36 days.

(21) Appl. No.: 14/457,196

(22) Filed: Aug. 12, 2014

(65) Prior Publication Data
US 2016/0047452 A1    Feb. 18, 2016

(51) Int. Cl.
*F16H 35/00* (2006.01)
*F16H 49/00* (2006.01)

(52) U.S. Cl.
CPC ....... *F16H 49/001* (2013.01); *F16H 2049/003* (2013.01); *F16H 2049/006* (2013.01)

(58) Field of Classification Search
CPC .................................................. F16H 49/001
USPC .......................................................... 74/640
See application file for complete search history.

(56) References Cited

U.S. PATENT DOCUMENTS

| | | | |
|---|---|---|---|
| 2,906,143 A | | 9/1959 | Musser |
| 3,187,605 A | * | 6/1965 | Stiff ..................... F16H 49/001 74/640 |
| 3,525,890 A | * | 8/1970 | Buchanan, Jr. ......... F16H 1/321 310/82 |
| 3,532,005 A | * | 10/1970 | Carpenter ............. F16H 49/001 475/163 |
| 4,646,587 A | | 3/1987 | Danel |

FOREIGN PATENT DOCUMENTS

JP    2011-2084    1/2011

OTHER PUBLICATIONS

International Search Report and Written Opinion issued in co-pending PCT Application No. PCT/US2015/027711, filed Apr. 27, 2015.

* cited by examiner

*Primary Examiner* — Ha D Ho
(74) *Attorney, Agent, or Firm* — Joseph M. Rolnicki; Evans & Dixon, L.L.C.

(57) ABSTRACT

A harmonic drive apparatus (also known as a strain wave gear) is constructed with a circular, flexible spline disc having a slightly conical configuration. The flexible saline disc has opposite convex and concave surfaces with a plurality of radial, flexible gear teeth arranged circumferentially on the convex surface. The flexible spline disc enables the harmonic drive apparatus to provide a thinner or more compact packing when needed for unique space requirements of a speed reduction transmission.

17 Claims, 8 Drawing Sheets

HARMONIC DRIVE APPARATUS

FIELD

The present disclosure relates generally to a harmonic drive apparatus, also known as a strain wave gear. In particular, the present disclosure relates to a harmonic drive apparatus having a flexible spline with a conical configuration.

BACKGROUND

Harmonic drive apparatus are generally cylindrical speed reduction transmissions that can drastically reduce the speed of an input shaft transmitted to an output shaft with little or no backlash. Harmonic drive apparatus can be contained in small housings and are used extensively in applications where size and backlash are critical, such as in robotics. Harmonic drive apparatus were first introduced around 1957.

The typical construction of a harmonic drive apparatus comprises a cylindrical flexible spline inside a cylindrical fixed spline. A plurality of flexible, parallel gear teeth are provided on a cylindrical exterior surface of the flexible spline. A further plurality of parallel, rigid gear teeth are provided on a cylindrical interior surface of the fixed spline. The fixed spline gear teeth project inwardly toward the flexible spline gear teeth. The number of fixed spline gear teeth is larger than the number of flexible spline gear teeth.

An output shaft of the harmonic drive apparatus is connected to the flexible spline.

An input shaft of the harmonic drive apparatus is connected to a wave generator having an elliptical exterior surface. The wave generator elliptical exterior surface is positioned inside the flexible spline. The elliptical surface is positioned in a same plane as the flexible spline gear teeth and the fixed spline gear teeth. The elliptical surface engages an interior surface of the flexible spline at two 180 degrees spaced locations on the elliptical surface and pushes the flexible spline teeth into engagement with the fixed spline teeth. On rotation of the input shaft and rotation of the elliptical surface, the gear teeth on the flexible spline 180 degrees apart are pushed into engagement with the gear teeth of the fixed spline and the engagement between the gear teeth causes rotation of the flexible spline and the output shaft.

Even though harmonic drive apparatus are typically smaller than other gear reduction transmissions, there may be situations where even more compact, thinner packaging would be desirable. Thus, there is a need for an alternative packaging envelope of a harmonic drive apparatus where thinness or compactness is desirable.

SUMMARY

The harmonic drive apparatus (also known as a strain wave gear) of this disclosure includes a conical or flat flexible spline disc. The flexible spline disc enables the apparatus to provide an even thinner or even more compact packaging when needed for unique space requirements of a speed reduction transmission.

The harmonic drive apparatus includes an input shaft having a center axis that defines mutually perpendicular axial and radial directions, and an output shaft that is coaxial with the input shaft.

The apparatus also includes a wave generator disc that has axially opposing first and second circular surfaces that are coaxial with the center axis. The wave generator disc first surface is connected to the input shaft, whereby rotation of the input shaft rotates the wave generator disc. The wave generator disc second surface is a saddle shaped wave surface. The wave surface rotates around the center axis and has a sequential wave pattern of a crest that projects axially from the wave generator disc, then a trough that is axially recessed into the wave generator disc, then another crest that projects axially from the wave generator disc and then another trough that is axially recessed into the wave generator disc. The pair of crests project axially from the wave generator disc on radially opposite sides of the center axis and the pair of troughs are recessed axially into the wave generator disc on radially opposite sides of the center axis.

A plurality of roller bearings are arranged circumferentially around the center axis. The plurality of roller bearings are configured in rolling engagement with the wave generator disc wave surface.

A conical or flat, flexible spline disc is positioned on the axially opposite side of the roller bearings from the wave generator disc wave surface. The flexible spline disc has axially opposing first and second circular surfaces that are coaxial with the center axis. When the flexible spline disc has a conical configuration, the flexible spline first surface is generally concave and the flexible spline second surface is generally convex. The flexible spline first surface engages in rolling contact with the plurality of roller bearings. The flexible spline second surface is connected to the output shaft. The flexible spline second surface also has a plurality of radial, flexible gear teeth that are arranged around the center axis on the flexible spline second surface.

A rigid, fixed spline disc is positioned axially adjacent the flexible spline. The fixed spline has axially opposing first and second surfaces that are coaxial with the center axis. The fixed spline first surface has a plurality of radial, rigid gear teeth arranged circumferentially around the center axis on the first surface. The plurality of rigid gear teeth axially oppose the plurality of radial, flexible gear teeth on the flexible spline.

The pair of crests on the wave generator disc push a first and a second group of the flexible gear teeth on the flexible spline disc axially into engagement with a first and a second group of the rigid gear teeth on the fixed spline disc. The pair of troughs on the wave generator disc allow a third and a fourth group of the flexible gear teeth on the flexible spline disc to move axially away from and out of engagement with a third and a fourth group of rigid gear teeth on the fixed spline disc.

A housing encloses the wave generator disc, the plurality of roller bearings, the flexible spline disc and the fixed spline disc. The input shaft and the output shaft extend from axially opposite ends of the housing.

On rotation of the input shaft, the wave surface on the wave generator disc is rotated around the center axis and the pair of crests axially push the flexible spline and the first and second groups of gear teeth on the flexible spline into engagement with the first and second groups of rigid gear teeth on the fixed spline. The engaging groups of teeth rotate around the center axis in response to rotation of the input shaft and produce rotation of the flexible spline and the output shaft at a substantially reduced rate of rotation.

The features, functions, and advantages that have been discussed can be achieved independently in various embodiments or may be combined in other embodiments, further details of which can be seen with reference to the following description and drawings.

DETAILED DESCRIPTION

Figure 1:
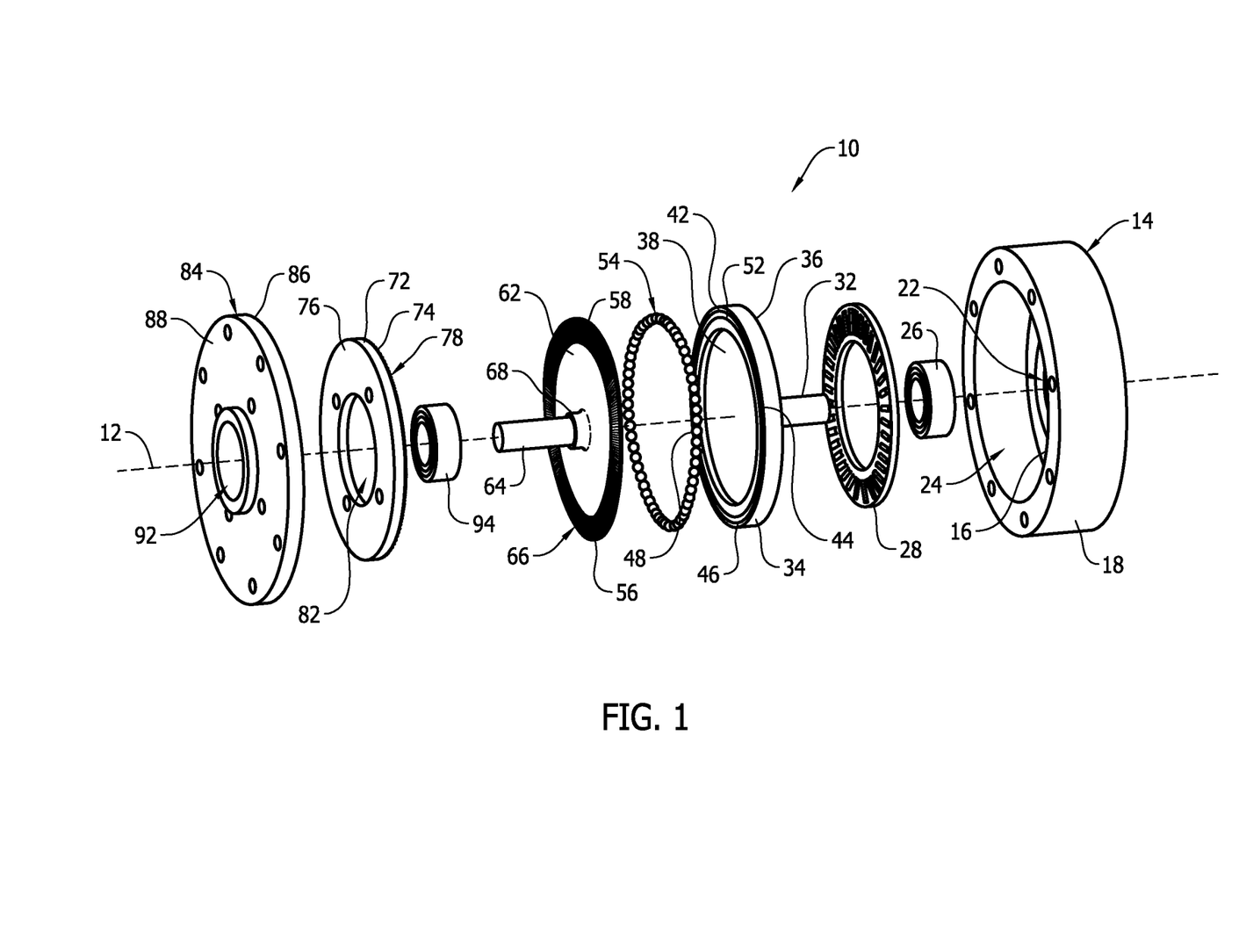
FIG. 1 is a representation of a perspective view of the disassembled component parts of the harmonic drive apparatus from the left of the apparatus.
Figure 2:
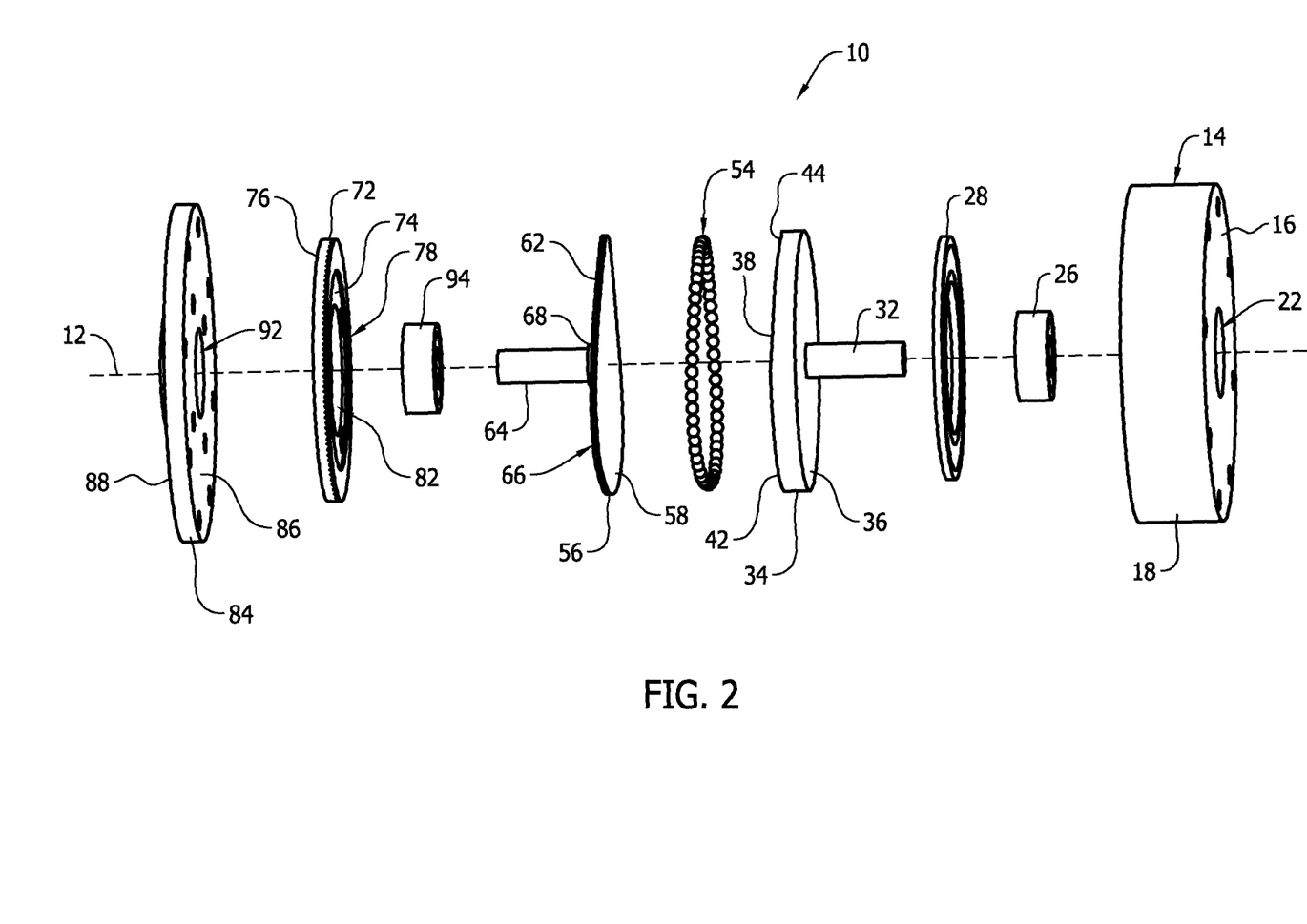
FIG. 2 is a representation of a perspective view of the component parts of the apparatus from the right of the apparatus.

FIGS. 1 and 2 show representations of the component parts of the harmonic drive apparatus 10 (also known as a strain wave gear) of this disclosure with the component parts being disassembled to better show the relative relationship of the parts. The parts are arranged coaxially along a center axis 12 of the apparatus in the sequential positions represented in FIGS. 1 and 2. The parts of the apparatus 10 can be constructed of any materials typically employed in constructing the component parts of a speed reduction transmission.

The apparatus 10 includes a first housing piece 14 having a circular end wall 16 and a cylindrical side wall 18 that extends axially from the outer periphery of the end wall 16. A small circular opening 22 is provided through the housing end wall 16. The opening 22 is coaxial with the center axis 12. The cylindrical side wall 18 surrounds a larger opening 24 into the interior of the first housing piece 14. A conventional cylindrical bearing assembly 26, for example a cylindrical roller bearing is press fit into the end wall opening 22. A conventional thrust bearing, for example a single roll thrust roller bearing 28 is inserted through the housing larger opening 24 and is positioned against the interior surface of the end wall 16.

An input shaft 32 of the apparatus extends through the center of the thrust roller bearing 28 and the cylindrical bearing 26. The cylindrical bearing 26 mounts the input shaft 32 for rotation relative to the apparatus 10 about the center axis 12.

Figure 3:
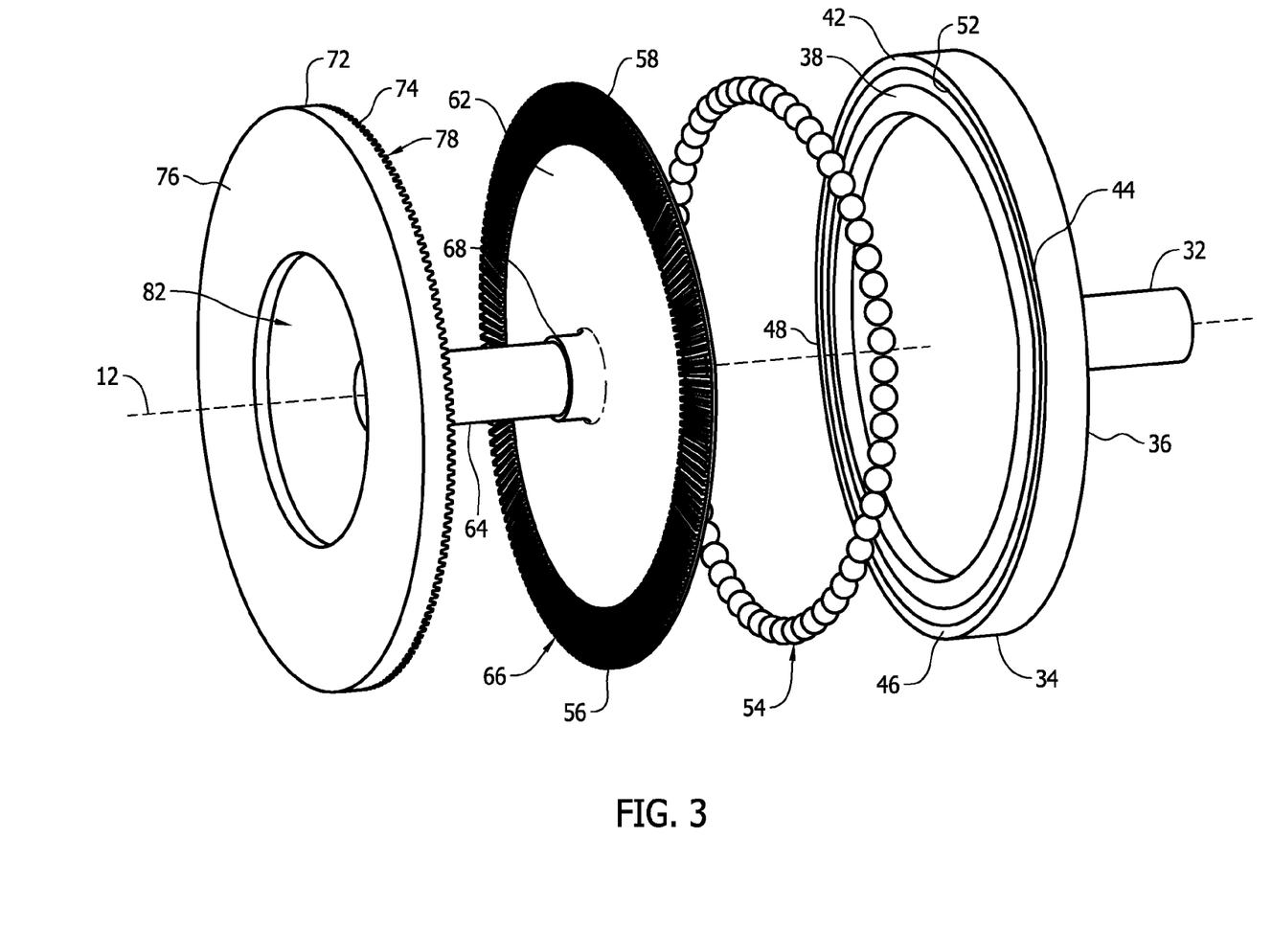
FIG. 3 is a representation of a perspective view similar to that of FIG. 1, but showing enlarged views of selected drive components of the apparatus.
Figure 7:
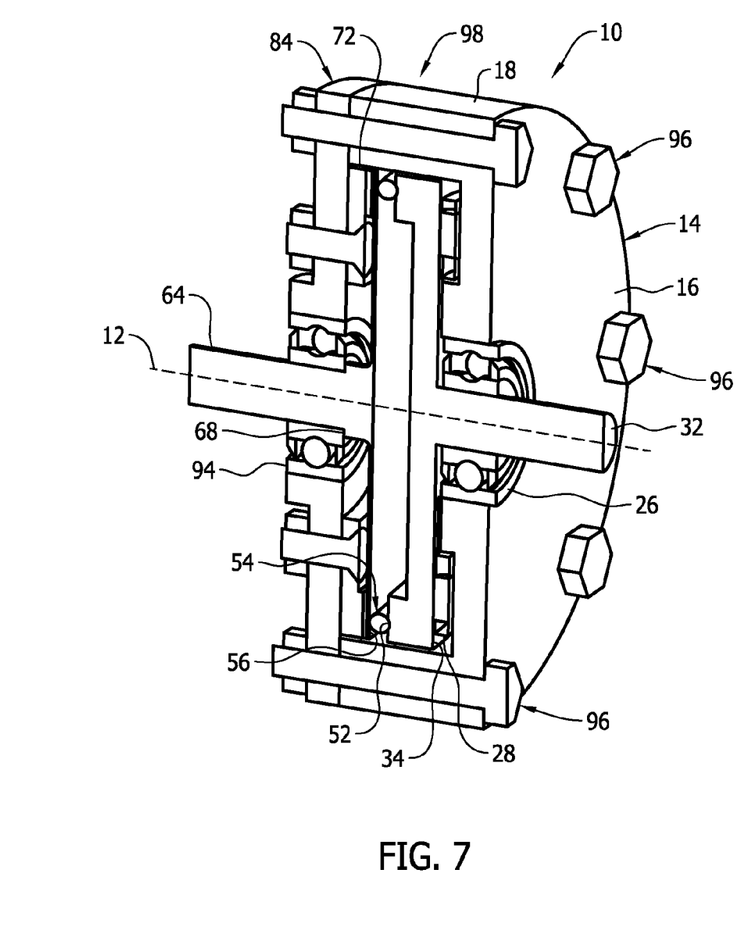
FIG. 7 is a representation of a cross-section perspective view of the apparatus.

A wave generator disc 34 is positioned in the first housing piece 14. The wave generator disc 34 has axially opposing first 36 and second 38 circular surfaces that are coaxial with the center axis 12. The wave generator disc first surface 36 is positioned in rolling engagement against the thrust roller bearing 28 as represented in FIG. 7. As represented in FIG. 2, the input shaft 32 is connected to the wave generator disc first circular surface 36, whereby rotation of the input shaft rotates the wave generator disc 34 in the first housing piece 14. Referring to FIGS. 1 and 3, the wave generator disc second circular surface 38 has the configuration of a saddle shaped wave surface. The wave surface circles around the center axis 12 and has a sequential wave pattern of a first crest 42 that projects axially from the wave generator disc 34, then a trough 44 that is axially recessed into the wave generator disc 34, then another crest 46 that projects axially from the wave generator disc 34 and then another trough 48 that is axially recessed into the wave generator disc 34. As represented in FIGS. 1 and 3, the pair of crests 42, 46 project axially from the wave generator disc 34 on radially opposite sides of the center axis 12 and the pair of troughs 44, 48 are recessed axially into the wave generator disc 34 on radially opposite sides of the center axis 12. Also represented in FIGS. 1 and 3 is a circular bearing groove 52 formed in the wave generator disc second circular surface 38 adjacent the outer periphery of the second circular surface 38.

As represented in FIGS. 1, 3 and 7, a plurality of bearings 54 are positioned in the circular bearing groove 52 in the wave generator disc second circular surface 38. In the representation of the apparatus in FIGS. 1, 3 and 7, the plurality of bearings 54 are separate spherical ball bearings. It should be understood that other equivalent types of bearings and bearing assemblies could be substituted for the ball bearings 54.

Figure 4:
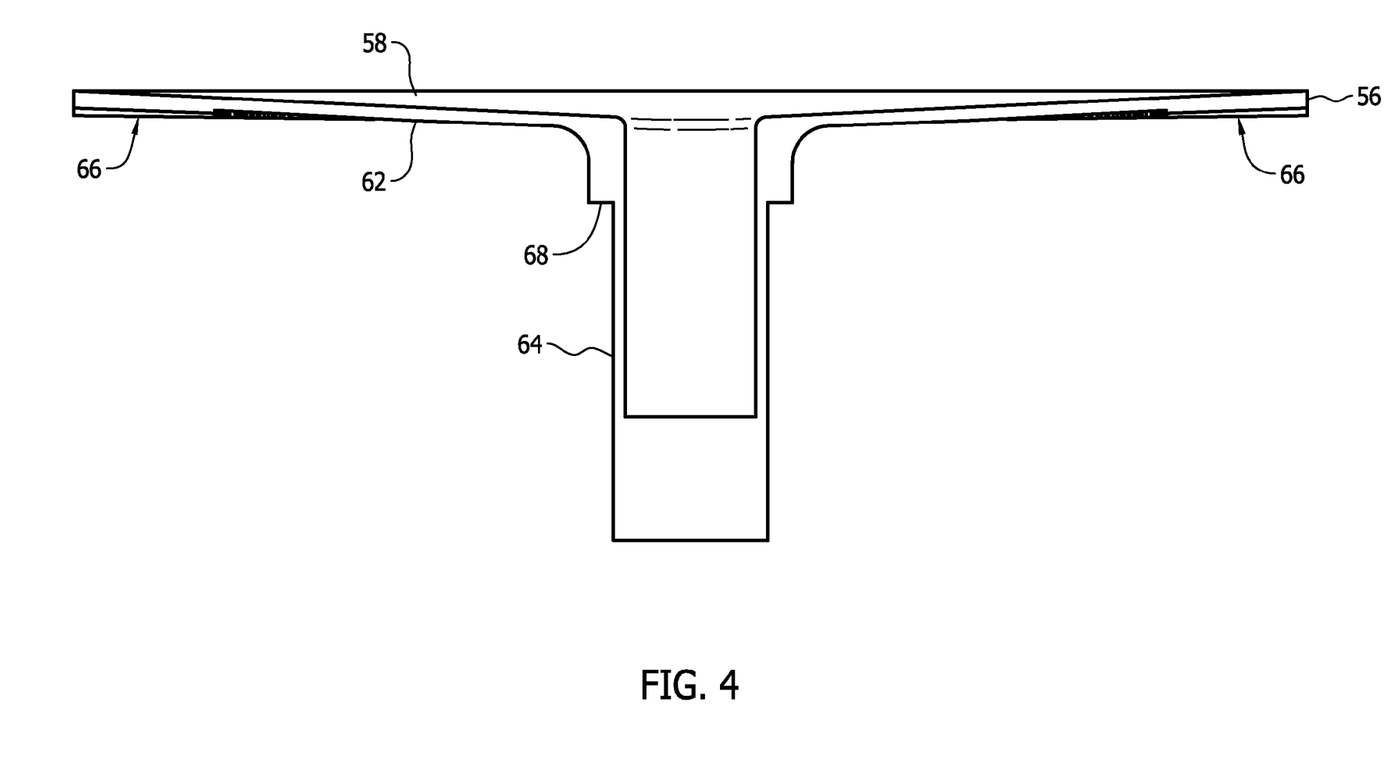
FIG. 4 is a representation of a cross-section view of the flexible spline of the apparatus.
Figure 5:
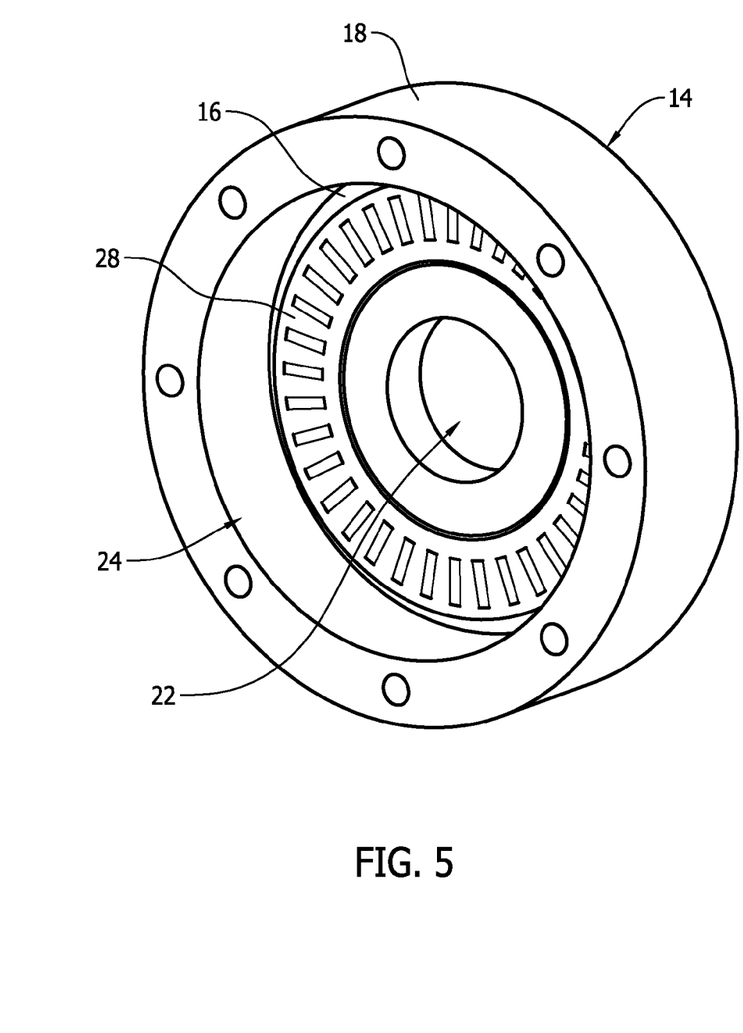
FIG. 5 is a representation of a perspective view of a right side housing piece shown in FIG. 1.
Figure 8:
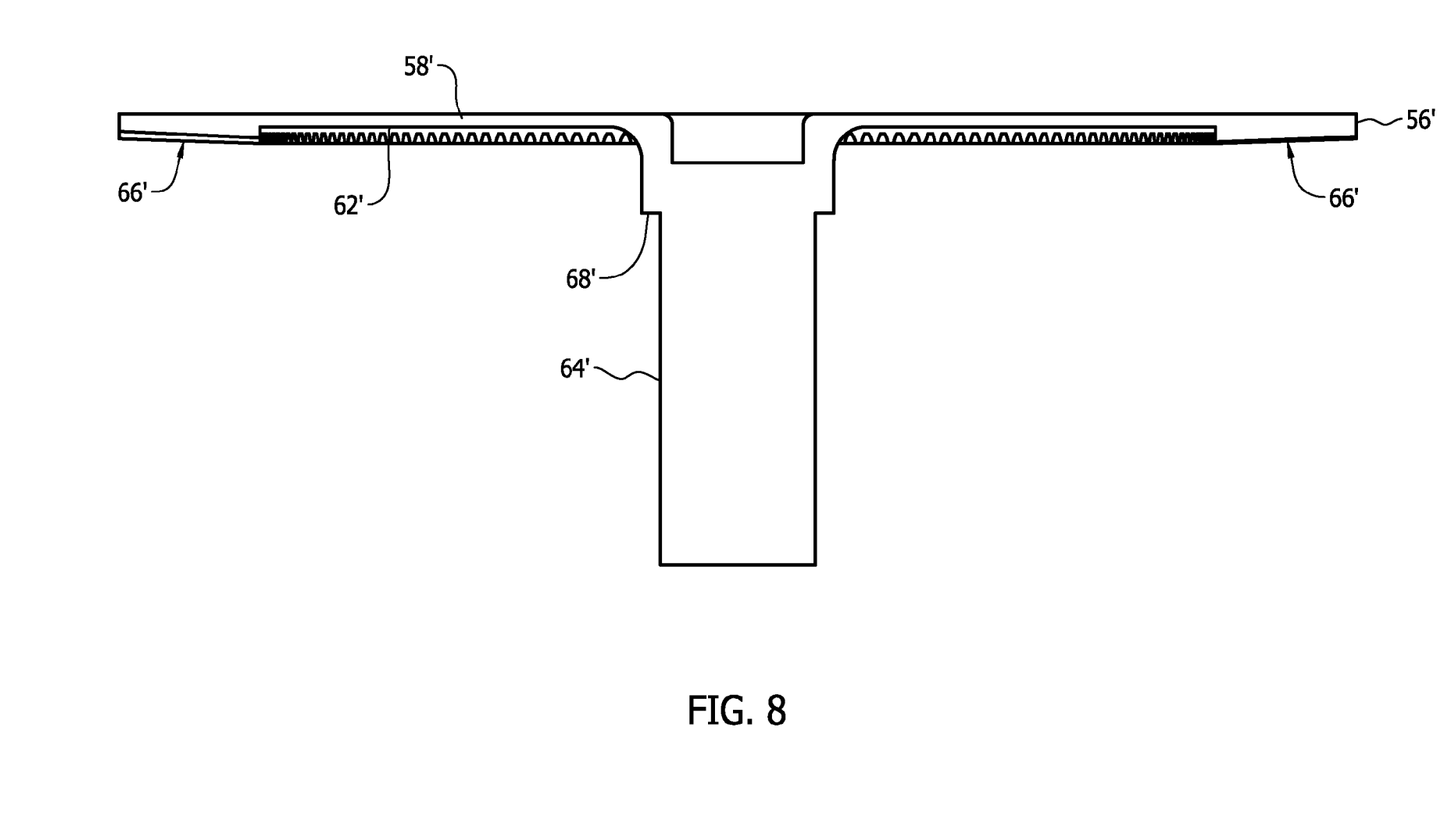
FIG. 8 is a representation of a cross-section view of a further embodiment of the flexible spline of the apparatus.

A flexible spline disc 56 is positioned on the axially opposite side of the ball bearings 54 from the wave generator disc second circular surface 38. The flexible spline disc 56 has axially opposed first 58 and second 62 circular surfaces that are coaxial with the center axis 12. In the embodiment of the apparatus 10 represented in the drawing figures, the flexible spline disc 56 has a conical configuration. Referring to the cross section of the flexible spline disc 56 represented in FIG. 4, the conical configuration gives the flexible spline disc first circular surface 58 a general concave configuration and gives the flexible spline disc second circular surface 62 a general convex configuration. In an alternate embodiment of the flexible spline disc 56 the disc is flat and the axially opposed first 58 and second 62 circular surfaces of the disc are flat. FIG. 8 shows a representation of the flat embodiment of the flexible spline disc 56'. In FIG. 8 the same reference numbers of FIG. 4 are used, with the reference numbers being followed by a prime ('). As represented in FIG. 7, the flexible spline disc first circular surface 58 engages in rolling contact with the plurality of ball bearings 54. The flexible spline disc second circular surface 62 is connected to an output shaft 64 of the apparatus 10. The flexible spline disc 56 and the output shaft 64 are coaxial with the center axis 12. The flexible spline disc second circular surface 62 also has a plurality of radial, flexible gear teeth 66 that are arranged circumferentially on the second circular surface 62 around the center axis 12 and adjacent the periphery of the disc. An annular lip 68 (shown in FIGS. 1 and 2) can be provided on the output shaft 64 to enable a bearing (to be described) to provide minimal thrust pushing the flexible spline disc 56 against the wave generator disc 34.

A rigid, fixed spline disc 72 is positioned axially adjacent the flexible spline disc 56. The fixed spline disc 72 has axially opposed first 74 and second 76 circular surfaces that are coaxial with the center axis 12. The fixed spline disc first circular surface 74 has a plurality of radial, rigid gear teeth 78 arranged circumferentially around the center axis 12 on the first circular surface 74 adjacent the periphery of the first circular surface. The plurality of rigid gear teeth 78 axially oppose the plurality of flexible gear teeth 66 on the flexible spline disc 56. The fixed spline disc 72 has a center hole 82 through the disc that is coaxial with the center axis 12. With the fixed spline disc 72 positioned axially adjacent the flexible spline disc 56, the output shaft 64 extends coaxially through the fixed spline disc 72 center hole 82.

Figure 6:
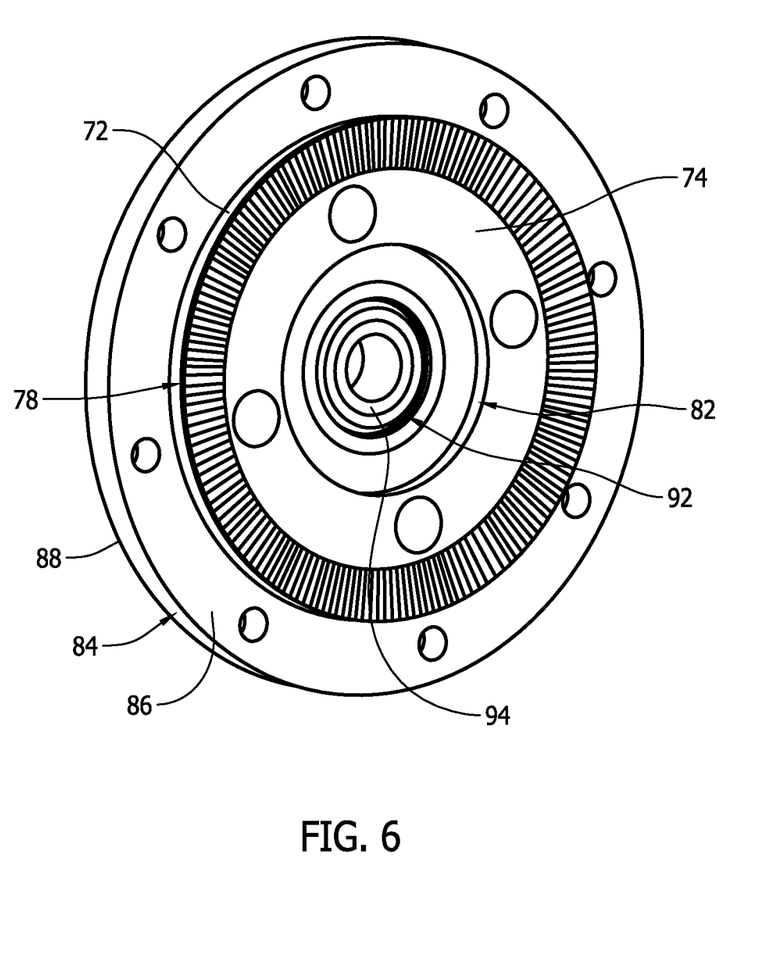
FIG. 6 is a representation of a perspective view of a left side housing piece shown in FIG. 1.

A second housing piece 84 is secured to the fixed spline disc second circular surface 62 and the cylindrical side wall 18 of the first housing piece 14. As represented in drawing FIGS. 1, 2 and 6, the second housing piece 84 is circular with opposing first 86 and second 88 surfaces that are coaxial with the center axis 12. The second housing piece 84 also has a center opening 92 that is circular and coaxial with the center axis 12. The second housing piece 84 center opening 92 is dimensioned to receive a second cylindrical bearing assembly 94 that is press fit in the opening 92. The second housing piece 84 first surface 86 is secured to the rigid, fixed spline disc 72, thereby fixing the fixed spline disc 72 stationary relative to the apparatus 10. A peripheral portion of the second housing piece 84 first surface 86 is also secured to the edge of the first housing piece 14 side wall 18 by a plurality of threaded fastener assemblies 96 as represented in FIG. 7. The output shaft 64 extends axially from the flexible spline disc 56, through the fixed spline disc 72 center hole 82 and the second cylindrical bearing assembly 94. Thus, the housing assembled from the first housing piece 14 and the second housing piece 84 encloses the thrust roller bearing 28, the wave generator disc 34, the plurality of ball bearings 54, the flexible spline disc 56 and the rigid, fixed spline disc 72 in an interior of the housing. The input shaft 32 and the output shaft 64 extend axially from opposite ends of the housing 98.

On rotation of the input shaft 32, the wave surface or second circular surface 38 of the wave generator disc 34 is rotated around the center axis 12 and the pair of crests 42, 46 axially push first and second groups of the ball bearings 54 on radially opposite sides of the center axis 12 into engagement with the flexible spline disc 56 first circular surface 58. Through the intermediary of the first and second groups of ball bearings 54, the pair of crests 42, 46 push the flexible spline disc 56 and first and second groups of radial, flexible gear teeth 66 on the flexible spline disc 56 on radially opposite sides of the center axis 12 into engagement with first and second groups of the radial, rigid gear teeth 78 on the rigid, fixed spline disc 72 on radially opposite sides of the center axis 12. The engaging groups of gear teeth on radially opposite sides of the center axis 12 rotate around the center axis 12 in response to rotation of the input shaft 32 around the center axis and produce rotation of the flexible spline disc 56 and the output shaft 64 at a substantially reduced rate of rotation.

The reduction ratio of the harmonic drive apparatus 10 is calculated in the same manner as a conventional harmonic drive apparatus. The reduction ratio is equal to the number of radial, flexible gear teeth 66 minus the number of radial, rigid gear teeth 78, divided by the number of radial, flexible gear teeth 66.

As various modifications could be made in the construction of the apparatus and its method of operation herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A harmonic drive apparatus comprising:
an input shaft having a center axis, the center axis defining mutually perpendicular axial and radial directions;
an output shaft that is coaxial with the input shaft;
a rigid fixed spline having a plurality of radial, rigid gear teeth arranged circumferentially around the center axis;
a flexible spline connected to the output shaft, the flexible spline having opposing convex and concave surfaces with a plurality of radial, flexible gear teeth on the convex surface, the plurality of flexible gear teeth being arranged circumferentially on the convex surface extending completly around the center axis and being axially opposed to the plurality of radial, rigid gear teeth; and
a wave generator connected to the input shaft, the wave generator having a wave surface that extends around the center axis, the wave surface having at least one axially projecting crest and at least one axially recessed trough that extend around the center axis whereby on rotation of the input shaft the wave surface is rotated around the center axis and the at least one axially projecting crest push the flexible spline concave surface and a group of the flexible gear teeth into engagement with a group of the rigid gear teeth causing rotation of the flexible spline and rotation of the output shaft.

2. The apparatus of claim 1, further comprising:
the wave generator wave surface having a sequential wave pattern of axially projecting crests and axially recessed troughs.

3. The apparatus of claim 1, further comprising:
the at least one axially projecting crest being one of a pair of crests on the wave surface on radially opposite sides of the center axis; and,
the at least one axially recessed trough being one of a pair of troughs on the wave surface on radially opposite sides of the center axis.

4. The apparatus of claim 1, further comprising:
a plurality of roller bearings engaged between the flexible spline concave surface and the wave generator wave surface.

5. The apparatus claim 1, further comprising:
a housing enclosing the fixed spline, the flexible spline and the wave generator, wherein the input shaft and the output shaft extend in axially opposite directions from the housing.

6. The apparatus of claim 1, further comprising:
the flexible spline having a conical, disc shaped configuration.

7. The apparatus of claim 6, further comprising:
the wave generator having a disc shaped configuration.

8. The apparatus of claim 1, further comprising:
the flexible spline having a flat, disc shaped configuration.

9. A harmonic drive apparatus comprising:
an input shaft having a center axis, the center axis defining mutually perpendicular axial and radial directions, the input shaft being rotatable about the center axis;
an output shaft that is coaxial with the input shaft, the output shaft being rotatable about the center axis;
a fixed spline having a fixed spline surface, the fixed spline surface having a plurality of radial, rigid gear teeth arranged circumferentially around the center axis;
a flexible spline having a flexible convex spline surface, the flexible convex spline surface having a plurality of radial, flexible gear teeth arranged circumferentially on the convex surface extending completely around the center axis, at least one group of the flexible gear teeth meshing with at least one group of the rigid gear teeth, the flexible spline being operatively connected to the output shaft; and
a wave generator having a wave surface that extends around the center axis, the wave surface having at least one wave surface crest that projects axially toward the flexible spline and at least one wave surface trough that extends axially away from the flexible spline, the wave generator being operatively connected to the input shaft whereby rotation of the input shaft rotates the wave surface of the wave generator around the center axis and the wave surface crest axially pushes the flexible spline and a group of the flexible gear teeth into engagement with a group of the rigid gear teeth causing rotation of the flexible spline and rotation of the output shaft.

10. The apparatus of claim 9, further comprising:
the at least one wave surface crest being one of a pair of crests on the wave surface on radially opposite sides of the center axis; and
the at least one wave surface trough being one of a pair of troughs on the wave surface on radially opposite sides of the center axis.

11. The apparatus of claim 9, further comprising:
a plurality of roller bearings engaged between the flexible spline and the wave generator.

12. The apparatus of claim 9, further comprising:
a housing enclosing the flexible spline, the fixed spline and the wave generator, wherein the input shaft and the output shaft extend in axially opposite directions from the housing.

13. The apparatus of claim 9, further comprising:
the flexible spline having a conical, disc shaped configuration.

14. The apparatus of claim 13, further comprising:
the wave generator having a disc shaped configuration.

15. A harmonic drive apparatus comprising:
an input shaft having a center axis, the center axis defining mutually perpendicular axial and radial directions relative to the apparatus;
a wave generator disc having axially opposing first and second circular surfaces that are coaxial with the center axis, the wave generator disc first surface being connected to the input shaft whereby the wave generator disc rotates in response to rotation of the input shaft, the wave generator disc second surface being a wave surface that rotates around the center axis, the wave surface having a pair of crests that project axially from the wave generator disc on radially opposite sides of the center axis and having a pair of troughs that are recessed axially into the wave generator disc on radially opposite sides of the center axis;
a plurality of roller bearings arranged circumferentially around the center axis, the plurality of roller bearings configured for rolling engagement with the wave generator disc second surface;
a flexible spline disc having axially opposing first and second circular surfaces that are coaxial with the center axis, the flexible spline disc first surface being a concave, conical surface configured for rolling contact with the plurality of roller bearings, the flexible spline disc second surface being a convex, conical surface having a plurality of radial, flexible gear teeth arranged circumferentially on the surface extending completely around the center axis;
an output shaft that is coaxial with the center axis, the output shaft being connected to the flexible spline disc whereby the output shaft rotates in response to rotation of the flexible spline disc; and
a rigid, fixed spline disc having axially opposing first and second circular surfaces that are coaxial with the center axis, the fixed spline disc first surface having a plurality of radial, rigid gear teeth arranged circumferentially around the center axis on the fixed spline disc first surface, where the pair of crests on the wave generator disc are configured to push a first and a second group of gear teeth on the flexible spline disc axially into engagement with a first and a second group of gear teeth on the fixed spline disc and the pair of troughs on the wave generator disc are configured to allow a third and a fourth group of gear teeth on the flexible spline disc to move axially away from and out of engagement with a third and a fourth group of gear teeth on the fixed spline disc.

16. The apparatus of claim 15, further comprising:
a housing enclosing the wave generator disc, the plurality of roller bearings, the flexible spline disc and the fixed spline disc, wherein the input shaft and the output shaft extend from the housing.

17. The apparatus claim 16, wherein:
the input shaft and the output shaft extend from axially opposite sides of the housing.

* * * * *